United States Patent
Breon et al.

(10) Patent No.: US 12,509,646 B2
(45) Date of Patent: Dec. 30, 2025

(54) WATER-IN-SILICONE EMULSION BASED LIQUID CLEANER

(71) Applicant: W.M. Barr & Company, Inc., Memphis, TN (US)

(72) Inventors: Jonathan P. Breon, Memphis, TN (US); Timothy G. Teague, Nesbit, MS (US); Dennis Earl Shireman, Marion, AR (US)

(73) Assignee: W.M. BARR & COMPANY, INC., Memphis, TN (US)

( * ) Notice: Subject to any disclaimer, the term of this patent is extended or adjusted under 35 U.S.C. 154(b) by 857 days.

(21) Appl. No.: 17/708,248

(22) Filed: Mar. 30, 2022

(65) Prior Publication Data

US 2022/0325209 A1  Oct. 13, 2022

Related U.S. Application Data

(60) Provisional application No. 63/169,661, filed on Apr. 1, 2021.

(51) Int. Cl.
| | | |
|---|---|---|
| *C11D 1/66* | (2006.01) | |
| *C11D 1/72* | (2006.01) | |
| *C11D 1/825* | (2006.01) | |
| *C11D 3/37* | (2006.01) | |
| *C11D 3/43* | (2006.01) | |
| *C11D 17/00* | (2006.01) | |

(52) U.S. Cl.
CPC .......... *C11D 17/0017* (2013.01); *C11D 1/667* (2013.01); *C11D 1/825* (2013.01); *C11D 3/3734* (2013.01); *C11D 3/43* (2013.01); *C11D 2111/14* (2024.01)

(58) Field of Classification Search
CPC .. C11D 1/66; C11D 1/72; C11D 1/825; C11D 3/162; B08B 3/04
See application file for complete search history.

(56) References Cited

U.S. PATENT DOCUMENTS

| | | | | |
|---|---|---|---|---|
| 4,874,547 A | * | 10/1989 | Narula | C08J 3/03 |
| | | | | 106/38.22 |
| 5,665,804 A | * | 9/1997 | Hill | A61K 8/585 |
| | | | | 424/407 |
| 5,977,040 A | * | 11/1999 | Inada | C23G 1/36 |
| | | | | 510/506 |
| 2005/0027079 A1 | | 2/2005 | Palmer Lauer et al. | |
| 2006/0128816 A1 | | 6/2006 | Cheng et al. | |
| 2012/0045587 A1 | | 2/2012 | Sharoyan et al. | |
| 2019/0060184 A1 | | 2/2019 | Doering et al. | |
| 2019/0133897 A1 | * | 5/2019 | Suzuki | C11D 3/2041 |

FOREIGN PATENT DOCUMENTS

WO  1992018600 A1  10/1992

OTHER PUBLICATIONS

International Search Report and Written Opinion of Patent Application No. PCT/US2022/022718, dated Jun. 16, 2022, all enclosed pages cited.
International Search Report (ISR) for PCT Application No. PCT/US2022/022718; Issued Jun. 16, 2022 (2 Pages).
International Preliminary Report on Patentability for PCT Application No. PCT/US2022/022718; Issued Oct. 12, 2023 (12 Pages).

\* cited by examiner

*Primary Examiner* — Brian P Mruk
(74) *Attorney, Agent, or Firm* — Shumaker, Loop & Kendrick, LLP

(57) ABSTRACT

An emulsion having a volatile silicone solvent or silicone solvent blend, a primary non-ionic emulsifier substantially free of silicone or a blend of non-ionic emulsifiers substantially free of silicone, and water.

34 Claims, No Drawings

WATER-IN-SILICONE EMULSION BASED LIQUID CLEANER

CROSS-REFERENCE TO RELATED APPLICATION

This application claims priority from U.S. provisional patent application No. 63/169,661, filed on Apr. 1, 2021, in the United States Patent and Trademark Office. The disclosure of which is incorporated herein by reference in its entirety.

FIELD OF THE INVENTION

The present invention relates to an emulsion-based liquid cleaner composition, more particularly to a water-in-silicone emulsion composition.

BACKGROUND OF THE INVENTION

There is currently a need in automotive body shops and other consumer markets for a liquid cleaner that: provides easy removal of dirt, grease and mold-release compounds; contains 25 gram/liter or less Volatile Organic Compounds (VOC); low odor, non-aggressive toward plastic, glass, metal and other substrates; dissipates static build up; remains stable upon prolonged storage and/or exposure to fluctuating environmental conditions such as heat, freezing and humidity; does not drip or run when applied to the substrate; spreads easily; and dries rapidly to provide a clean defect and film-free surface that can be subsequently painted and the paint adheres well to the substrate.

SUMMARY OF THE INVENTION

The present invention relates to a water-in-silicone emulsion composition. The water-in-silicone emulsion is particularly suitable for use as a liquid cleaner.

In an embodiment of the invention, a water-in-silicone emulsion is provided. The water-in-silicone emulsion comprises: a volatile silicone solvent or silicone solvent blend; a primary non-ionic emulsifier substantially free of silicone; and water.

The water-in-silicone emulsion optionally further comprises a secondary emulsifier substantially free of silicone.

The water-in-silicone emulsion optionally further comprises a co-solvent substantially free of silicone.

In an embodiment of the invention, a method of cleaning or preparing a surface to remove any dirt, grease and mold-release compounds is provided. The method comprises applying the emulsion of the present invention to a surface as a thin film and wiping the emulsion from the surface.

In an embodiment of the invention, a method of cleaning or preparing an automotive surface to remove any dirt, grease and mold-release compounds is provided. The method comprises applying the emulsion of the present invention to an automotive surface as a thin film, and wiping the emulsion from the automotive surface.

In an embodiment of the invention, a method of painting a surface is provided. The method comprises applying the emulsion of the present invention to a surface as a thin film, wiping the emulsion from the surface, and painting the wiped surface.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

The present invention is directed to an emulsion, more particularly to a water-in-silicone emulsion. The water-in-silicone emulsion comprises: a volatile silicone solvent or silicone solvent blend; a primary non-ionic emulsifier substantially free of silicone; and water.

The emulsion preferably comprises the silicone solvent or silicone solvent blend in an amount of 10 weight % to 35 weight %, wherein the weight percent is based on the weight of the emulsion. The volatile silicone solvent or silicone solvent blend has a vapor pressure at 25° C. of >0.5 mm Hg. The volatile silicone solvent or silicone solvent blend can be a volatile cyclomethicone solvent. The volatile cyclomethicone solvent may comprise octamethylcyclotetrasiloxane and decamethylcyclopentasiloxane. Preferably, 50 weight % to 99 weight % of octamethylcyclotetrasiloxane is present and 1 weight % to 50 weight % of decamethylcyclopentasiloxane is present.

The emulsion preferably comprises a primary non-ionic emulsifier substantially free of silicone or a blend of non-ionic emulsifiers substantially free of silicone in an amount of 0.1 weight % to 2 weight %, wherein the weight percent is based on the weight of the emulsion. The primary non-ionic emulsifier or blend of non-ionic emulsifiers have a combined hydrophile-lipophile balance (HLB) number or value of 3 to 7. The hydrophile-lipophile balance (HLB) number is used as a measure of the ratio of these groups. It is a value between 0-60 defining the affinity of a surfactant for water or oil. HLB numbers are calculated for nonionic surfactants, and these surfactants have numbers ranging from 0-20.

The primary non-ionic emulsifier substantially free of silicone or blend of non-ionic emulsifiers substantially free of silicone having the combined HLB value of 3 to 7 may comprise a partially esterified reaction product of a polyol and fatty acid, an ethoxylated fatty acid or ethoxylated fatty alcohol or a combination thereof. The primary non-ionic emulsifier substantially free of silicone or the blend of non-ionic emulsifiers substantially free of silicone having the combined HLB value of 3 to 7 may comprise a partially esterified reaction product of a polyol and a branched saturated fatty acid, or an ethoxylated branched fatty acid or ethoxylated branched fatty alcohol or a combination thereof. The primary non-ionic emulsifier substantially free of silicone or the blend of non-ionic emulsifiers substantially free of silicone having the combined HLB value of 3 to 7 may comprise a partially esterified reaction product of a polyol and isostearic acid, ethoxylated isostearic acid or ethoxylated isostearyl alcohol or a combination thereof. The primary non-ionic emulsifier substantially free of silicone or the blend of non-ionic emulsifiers substantially free of silicone having the combined HLB value of 3 to 7 may have a molecular weight <5000 g/mol.

The water-in-silicone emulsion optionally comprises a secondary emulsifier. The secondary emulsifier is preferably substantially free of silicone. The secondary emulsifier can be cationic, anionic, non-ionic, or amphoteric. Preferably, the secondary non-ionic emulsifier is non-ionic. More preferably, the secondary non-ionic emulsifier has an HLB value of 2 to 15. The secondary non-ionic emulsifier may comprise a polyol fatty acid condensate, a fatty acid or a fatty alcohol. The secondary non-ionic emulsifier may comprise an ethoxylated polyol fatty acid condensate, an ethoxylated fatty acid, an ethoxylated fatty alcohol, or a combination thereof. The secondary emulsifier, if present, is in an amount of 0.01 weight % to 1 weight %, wherein the weight percent is based on the weight of the emulsion. In an aspect of the invention, the primary non-ionic emulsifier or blend of non-ionic emulsifiers is substantially free of silicone and has a combined average HLB of 2 to 8. The secondary emulsifier can also be a cationic emulsifier. Preferably, the secondary emulsifier is an imidazoline emulsifier.

In an embodiment of the invention, the water-in-silicone emulsion optionally comprises a co-solvent substantially free of silicone. The cosolvent preferably has a solubility in water of <1% at 20° C. The cosolvent substantially free of silicone has a vapor pressure less than 0.1 mm Hg at 20° C. or a boiling point greater or equal to 216° C. The co-solvent comprises an aliphatic, cycloaliphatic, or aromatic hydrocarbon or mixture thereof. The co-solvent is a low odor saturated hydrocarbon co-solvent substantially free of aromatic hydrocarbon. If present, the co-solvent is present in an amount of up to 15 percent by weight of the emulsion.

In an embodiment of the invention, the emulsion is substantially free of film-forming chemical components and/or film-forming polymers.

The emulsion may comprise a Volatile Organic Compound (VOC) content of 25 g/L or less in accordance with the South Coast Air Quality Management District (SCAQMD) Rule 1143. The emulsion may comprise a Volatile Organic Compound (VOC) content of 0.5 g/L or less in accordance with California Air Resources Board (CARB) Consumer Product regulations.

Among the properties of the emulsion of the present invention is that the emulsion when applied and spread in a thin layer evaporates in <5 minutes to leave a clean, film-free surface. The emulsion has a flash point of >100° F. The emulsion when applied and spread in a thin layer evaporates to leave a clean, film-free paintable surface.

In an embodiment of the invention, a method of cleaning or preparing a surface by applying the emulsion of the present invention to a surface as a thin film and wiping the surface to remove dirt, grease and mold-release compounds. wherein the emulsion comprises a volatile silicone solvent or silicone solvent blend, a primary non-ionic emulsifier substantially free of silicone or a blend of non-ionic emulsifiers substantially free of silicone, and water. The surface may be an automotive surface, more preferably an exterior automotive surface.

In an embodiment of the invention, a method of painting a surface by first cleaning with the emulsion of the present invention followed by subsequent application of paint.

EXAMPLES

Emulsion compositions were prepared in accordance with embodiments of the present invention. Comparative samples were also prepared.

TABLE 1

| Component | Sample #1 (comparative) | Sample #2 (comparative) | Sample #3 (comparative) | Sample #4 (comparative) | Sample #5 (comparative) | Sample #6 (comparative) |
|---|---|---|---|---|---|---|
| Xiameter PMX-0244 | 93.13 | 92.79 | 92.79 | 92.7 | 92.71 | 93.31 |
| Calumet LVP-100 | 11.64 | 11.59 | 11.59 | 11.59 | 11.59 | |
| Aromatic 200 | | | | | | 11.66 |
| Dowsil ES-5612 | 2.33 | | | | | |
| Span 60 | | 2.32 | | | | |
| Span 80 | | | 2.32 | 4.64 | 2.96 | 2.33 |
| Tween 80 | | | | | 0.52 | |
| Tap water | 358.55 | 356.92 | 356.92 | 354.59 | 355.78 | 359.26 |
| Total Wt. (g) | 465.65 | 463.62 | 463.62 | 463.52 | 463.56 | 466.56 |

TABLE 2

| Component | Sample #7 | Sample #8 | Sample #9 | Sample #10 | Sample #11 | Sample #12 |
|---|---|---|---|---|---|---|
| Xiameter PMX-0244 | 93.13 | 116.13 | 92.95 | 93.13 | 92.99 | 92.71 |
| Calumet LVP-100 | 11.64 | 11.61 | 6.97 | | 6.97 | 11.59 |
| Aromatic 200 | | | 4.42 | | | |
| Dowanol PPH | | | | 11.64 | | |
| Propylene Glycol | | | | | 4.65 | |
| Span 120 | 2.33 | 2.32 | 2.32 | 2.32 | 2.32 | |
| Isolan IS | | | | | | 3.48 |
| Tap water | 358.55 | 334.45 | 358.10 | 358.55 | 358 | 355.76 |
| Total Wt. (g) | 465.65 | 464.51 | 464.76 | 465.64 | 464.93 | 463.54 |

TABLE 3

| Component | Sample #13 | Sample #14 | Sample #15 | Sample #16 (comparative) | Sample #17 (comparative) | Sample #18 |
|---|---|---|---|---|---|---|
| Xiameter PMX-0244 | 93.13 | 93.13 | 93.13 | 92.66 | 92.66 | 93.34 |
| Calumet LVP-100 | 11.64 | 11.64 | 11.64 | 11.58 | 11.58 | 11.67 |
| Span 120 | | | | | | 2.33 |
| Isolan GI 34 | 2.33 | | | | | |
| Cithrol PG32IS | | 2.33 | | | | |
| Cithrol GMIS 40 | | | 2.33 | | | |
| Isolan PDI | | | | 2.32 | | 1.17 |
| Isolan GPS | | | | | 2.32 | |
| Tap water | 358.55 | 358.55 | 358.55 | 356.75 | 356.75 | 358.20 |
| Total Wt. (g) | 465.65 | 465.65 | 465.65 | 463.31 | 463.31 | 466.71 |

TABLE 4

| Component | Sample #19 (HLB = 6.06) | Sample #20 (HLB = 6.07) | Sample #21 (HLB = 4.8) | Sample #22 (HLB = 4.77) | Sample #23 (HLB = 6.99) | Sample #24 |
|---|---|---|---|---|---|---|
| Xiameter PMX-0244 | 92.96 | 92.96 | 92.13 | 92.13 | 93.34 | 93.22 |
| Calumet LVP-100 | 6.97 | 6.97 | 6.97 | 6.97 | 11.67 | 11.65 |
| Aromatic 200 | 4.42 | 4.42 | 4.41 | 4.41 | | |
| Span 120 | 3.02 | 3.02 | 2.32 | 2.32 | 2.33 | 2.33 |
| Tween 60 (HLB = 14.9) | 0.46 | | | | | |
| Tween 80 (HLB =15) | | 0.46 | | | | |
| Brij O2 (HLB = 5.0) | | | 1.16 | | | |
| Brij S2 (HLB = 4.9) | | | | 1.16 | | |
| Cithrol 4GMIS (HLB = 11.6) | | | | | 1.17 | |
| Crodazoline O | | | | | | 0.47 |
| Tap water | 356.95 | 356.95 | 356.85 | 356.85 | 358.20 | 358.41 |
| Total Wt. (g) | 464.78 | 464.78 | 463.84 | 463.84 | 466.71 | 466.08 |

The following were used in the above formulations:

Xiameter PMX-0244 is a mixture of octamethylcyclotetrasiloxane (>98) and decamethylcyclopentasiloxane (<2%) commercially available from Dow Chemical Company.

Calumet LVP-100 is an aliphatic hydrocarbon solvent available commercially from Calumet Specialty Products Partners, L.P.

Solvesso 200 is an aromatic hydrocarbon solvent commercially available from Exxon Mobil ChemicaTh-Dowanol PPh Glycol Ether is a propylene glycol phenyl ether, available from Dow Chemical Co.

Dowsil ES-5612 is a PEG-10 dimethicone, commercially available from Dow Chemical Co.

Span 60 is a sorbitan stearate, commercially available from Croda

Span 80 is a sorbitan oleate, commercially available from Croda

Span 120 is a sorbitan isostearate, commercially available from Croda

Isolan IS is a methyl glucose isostearate, commercially available from Evonik

Isolan GI 34 is a polyglyceryl-4 isostearate, commercially available from Evonik Cithrol PG32IS is a polyglyceryl-3 diisostearate, commercially available from Croda Cithrol GMIS 40 is a glyceryl isostearate, commercially available from Croda Isolan PDI is a Diisostearoyl Polyglyceryl-3 Dimer Dilinoleate, Mw ~8000-9000, commercially available from Evonik.

Isolan GPS is a Polyglyceryl-4 Diisostearate/Polyhydroxystearate/Sebacate, Mw ~6000-7000, commercially available from Evonik Tween 60 is a PEG-20 sorbitan stearate, commercially available from Croda.

Tween 80 is a PEG-20 sorbitan oleate, commercially available from Croda

Brij O2 is Oleth-2, commercially available from Croda

Brij S2 is a Steareth-2, commercially available from Croda

Cithrol 4GMIS is a PEG-8 glyceryl isostearate, commercially available from Croda Crodazoline O is an Oleyl hydroxyethyl imidazoline, commercially available from Croda

TABLE 5

| Experiment | Initial emulsion stability (type) | Initial Viscosity (cP) | Viscosity (2 weeks) | 50° C. Stability (days) | Leaves a clean, dry streak-free surface? | Freeze/Thaw stable (cycles) |
|---|---|---|---|---|---|---|
| Sample #1 (comparative) | Stable (w/o) | 1140 | 960 | >90 | No, slippery | Yes (3+) |
| Sample #2 (comparative) | Unstable | N/A | N/A | N/A | N/A | No |
| Sample #3 (comparative) | Stable (w/o) | 2120 | 980 | 3 | Yes | No |

TABLE 5-continued

| Experiment | Initial emulsion stability (type) | Initial Viscosity (cP) | Viscosity (2 weeks) | 50° C. Stability (days) | Leaves a clean, dry streak-free surface? | Freeze/Thaw stable (cycles) |
|---|---|---|---|---|---|---|
| Sample #4 (comparative) | Stable (w/o) | 2580 | 1300 | 12 | Yes | Yes (3+) |
| Sample #5 (comparative) | Stable (w/o) | 2000 | 880 | 18 | Yes | No |
| Sample #6 (comparative) | Stable (w/o) | 2880 | 1400 | 20 | Yes | No |
| Sample #7 | Stable (w/o) | 2500 | 1840 | >90 | Yes | No |
| Sample #8 | Stable (w/o) | 1240 | 920 | >90 | Yes | No |
| Sample #9 | Stable (w/o) | 2060 | 1600 | >90 | Yes | No |
| Sample #10 (comparative) | Unstable | N/A | N/A | N/A | N/A | No |
| Sample #11 | Stable (w/o) | 2800 | 1900 | 16 | Yes | Yes (1) |
| Sample #12 | Stable (w/o) | 2220 | 1560 | >90 | Yes | No |
| Sample #13 | Stable (w/o) | 1760 | 1280 | >90 | Yes | No |
| Sample #14 | Stable (w/o) | 2600 | 2080 | >90 | Yes | No |
| Sample #15 | Stable (w/o) | 3600 | 2060 | >90 | Yes | No |
| Sample #16 (comparative) | Unstable | N/A | N/A | N/A | N/A | No |
| Sample #17 (comparative) | Unstable | N/A | N/A | N/A | N/A | No |
| Sample #18 | Stable (w/o) | 2320 | 1000 | >90 | Yes | No |
| Sample #19 (HLB = 6.06) | Stable (w/o) | 2500 | 1320 | >90 | Yes | No |
| Sample #20 (HLB = 6.07) | Stable (w/o) | 2460 | 1120 | >90 | Yes | No |
| Sample #21 (HLB = 4.8) | Stable (w/o) | 2780 | 2000 | >90 | Yes | No |
| Sample #22 (HLB = 4.77) | Stable (w/o) | 3420 | 2080 | >90 | Yes | No |
| Sample #23 (HLB = 6.99) | Stable (w/o) | 3480 | 1600 | >90 | Yes | No |
| Sample #24 | Stable (w/o) | 2600 | 1600 | >90 | Yes | Yes (3+) |

Sample #1 did not a provide clean, film free surface.

Sample #2 demonstrated Span 60 was insoluble and did not provide stable dispersion, even when heated to 80° C.

Sample #3 vs. Sample #4 demonstrated higher Span 80 was not stable; emulsifier based on saturated fatty acid.

Sample #5 vs. Sample #3 demonstrated blend on non-isostearate emulsifier @ HLB=5.9 did not produce stable emulsion.

Sample #6 vs. Sample #3 demonstrated aromatic solvent did not improve stability to desired level with Span 80.

Sample #8 increased cyclomethicone (25%) providing reduced viscosity and good stability.

Sample #9 vs. Sample #7 demonstrated aliphatic or aromatic solvent with low water miscibility worked with Span 120.

Sample #10 vs. Sample #9 demonstrated cosolvent with solubility in water of 1% or greater did not provide stable emulsion.

Sample #11 demonstrated addition of water miscible glycol reduced heat age stability and did not provide freeze-thaw stability.

Sample #12 demonstrated Isolan IS (methyl glucose isostearate) provided stable emulsion.

Sample #13 demonstrated Isolan GI 34 (polyglyceryl-4 isostearate, Mw ~1500-2000) provided stable emulsion.

Sample #14 demonstrated Cithrol PG32IS (polyglyceryl-3 diisostearate) provided stable emulsion.

Sample #15 demonstrated Cithrol GMIS 40 (glyceryl isostearate) provided stable emulsion.

Sample #16 (comparative) vs. Sample #7 demonstrated Isolan PDI (Diisostearoyl Polyglyceryl-3 Dimer Dilinoleate, Mw ~8000-9000) was partially soluble and did not provide stable dispersion, even when heated to 80 C.

Sample #17 (comparative) vs. Sample #7 demonstrated Isolan GPS (Polyglyceryl-4 Diisostearate/Polyhydroxystearate/Sebacate, Mw ~6000-7000) was partially soluble and did not provide stable dispersion, even when heated to 80 C.

Sample #18 demonstrated high MW secondary co-emulsifier can be used in combination with primary emulsifier of the invention to provide a stable emulsion.

Sample #24 demonstrated addition of imidazoline co-emulsifier improved freeze/thaw stability.

Samples #18, 19, 20, 21, 22, 23, 24 demonstrated various co-emulsifiers can be used with the primary emulsifier of the invention to provide a stable emulsion.

Effective HLB was calculated as a weighted average of the known HLB of the primary and secondary emulsifier in the cases where multiple emulsifiers were used. Water-in-silicone emulsions were prepared by first dissolving the emulsifier(s) in the silicone solvent and optional co-solvent. The silicone solvent, emulsifier(s) and optional co-solvent were added to a 1 pt. plastic container and stirred with a four bladed propeller mixer at 500 RPM for 5 min. Water was then slowly added to the mixture while increasing the mixing speed to 2000 RPM throughout the course of addition. Once addition of water was complete the water-in-silicone emulsion was stirred for an additional 10 minutes at 2000 RPM. The initial viscosity and appearance were recorded. Formation of the desired water-in-silicone emulsion was readily apparent from the emulsion viscosity, being in the range of 750-3000 cP at 20° C. The formation of the water-in-silicone type emulsion was also verified by addition of a water soluble solid dye to the emulsion and observing the color under a microscope. The viscosity was measured using a Brookfield RVT viscometer using a number 3 spindle at 30 RPM at 20° C. Viscosity at 20° C. was again measured after two weeks storage at room temperature. Heat age stability was determined by adding 15 mL of emulsion to a glass jar and heating in an oven at 50° C. Stability of the emulsion was evaluated over the course of 90 days. An emulsion was deemed to be stable if after shaking, the desired water-in-silicone emulsion was reformed. Some separation of the phases was acceptable during storage, however emulsions that separated completely were deemed unstable. Stability was readily apparent from the viscosity of the emulsion. If the emulsion viscosity dropped substantially after shaking, the emulsion was deemed unstable. This low viscosity is due to inversion of the water-in-silicone emulsion to a silicone-in-water emulsion. If inversion to a silicone-in-water emulsion did occur, the product would no longer provide acceptable viscosity and cleaning properties, especially in regard to the ability to dissolve tar. The cleaning properties were evaluated on a thermoplastic polyolefin bumper, glass window and melamine veneer. 1 mL of emulsion was deposited on the surface and wiped away in a circular motion until complete evaporation occurred. The surface was then examined by wiping the surface with a nitrile gloved finger to determine if a notable tactile change to the surface occurred (i.e. a film was deposited that caused the surface to become slippery). The ability of the emulsion to dissolve tar was also evaluated on a melamine veneer. A 50/50 solution of tar in xylene was applied by a sponge to a smooth white melamine veneered piece of plywood. The solution was allowed to dry, resulting in a film of dry tar deposited on the surface. The ability of the emulsion to dissolve this tar and remove if from the melamine veneer was evaluated by dipping a cotton swab into the emulsion and gently swabbing the tar covered melamine surface in an up and down motion until the tar had dissolved (approx. 3-10 strokes). Freeze-thaw stability was evaluated by adding 15 mL of emulsion to a glass jar and storing in a freezer for 24 hrs. The emulsion was then removed from the freezer and allowed to thaw at room temperature for 2 hours. If the emulsion had separated after it had thawed it was shaken to determine if a water-in-oil could be easily reformed. This cycle was repeated 3 times and the results recorded.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A water-in-silicone emulsion comprising:
   from 10 weight percent to 35 weight percent of a volatile silicone solvent or silicone solvent blend,
   from 0.1 weight percent to 2 weight percent of a primary non-ionic emulsifier free of silicone or a blend of non-ionic emulsifiers free of silicone, based on the total weight of the emulsion;
   up to 15 weight percent of a co-solvent, free of silicone, wherein the co-solvent has a solubility in water of <1% at 20° C.; and
   from 72 weight percent to 77 weight percent water.

2. The water-in-silicone emulsion according to claim 1, wherein the volatile silicone solvent or silicone solvent blend has a vapor pressure at 25° C. of >0.5 mm Hg.

3. The water-in-silicone emulsion according to claim 2, wherein the volatile silicone solvent or silicone solvent blend is a volatile cyclomethicone solvent.

4. The water-in-silicone emulsion according to claim 3, wherein the volatile cyclomethicone solvent comprises octamethylcyclotetrasiloxane and decamethylcyclopentasiloxane.

5. The water-in-silicone emulsion according to claim 4, wherein the volatile silicone solvent or silicone solvent blend comprises from 50 weight % to 99 weight % of octamethylcyclotetrasiloxane and from 1% to 50% of decamethylcyclopentasiloxane based on the total weight of the volatile silicone solvent or silicone solvent blend.

6. The water-in-silicone emulsion according to claim 1, wherein the silicone solvent or silicone solvent blend is 10% to 25% by weight of the emulsion.

7. The water-in-silicone emulsion according to claim 1, wherein the primary non-ionic emulsifier or blend of non-ionic emulsifiers have a combined HLB value of 3 to 7.

8. The water-in-silicone emulsion according to claim 7, wherein the primary non-ionic emulsifier free of silicone or the blend of non-ionic emulsifiers free of silicone having the combined HLB value of 3 to 7 comprise a partially esterified reaction product of a polyol and fatty acid, an ethoxylated fatty acid, an ethoxylated fatty alcohol or a combination thereof.

9. The water-in-silicone emulsion according to claim 7, wherein the primary non-ionic emulsifier free of silicone or the blend of non-ionic emulsifiers free of silicone having the combined HLB value of 3 to 7 comprise a partially esterified reaction product of a polyol and a branched saturated fatty acid, an ethoxylated branched fatty acid, an ethoxylated branched fatty alcohol, or a combination thereof.

10. The water-in-silicone emulsion according to claim 7, wherein the primary non-ionic emulsifier free of silicone or the blend of non-ionic emulsifiers free of silicone having the combined HLB value of 3 to 7 comprise a partially esterified reaction product of a polyol and isostearic acid, an ethoxylated isostearic acid, an ethoxylated isostearyl alcohol, or a combination thereof.

11. The water-in-silicone emulsion according to claim 7, wherein the primary non-ionic emulsifier free of silicone or the blend of non-ionic emulsifiers free of silicone having the combined HLB value of 3 to 7 has a molecular weight <5000 g/mol.

12. The water-in-silicone emulsion according to claim 1, further comprising a secondary emulsifier free from silicone.

13. The water-in-silicone emulsion according to claim 12, wherein the secondary emulsifier free from silicone is non-ionic.

14. The water-in-silicone emulsion according to claim 13, wherein the secondary non-ionic emulsifier free from silicone has an HLB value of 2 to 15.

15. The water-in-silicone emulsion according to claim 14, wherein the secondary non-ionic emulsifier free from silicone having an HLB value of 2 to 15 comprises a polyol fatty acid condensate, a fatty acid or a fatty alcohol.

16. The water-in-silicone emulsion according to claim 14, wherein the secondary non-ionic emulsifier free from silicone having an HLB value of 2 to 15 comprises an ethoxylated polyol fatty acid condensate, an ethoxylated fatty acid, or an ethoxylated fatty alcohol.

17. The water-in-silicone emulsion according to claim 14, wherein the secondary non-ionic emulsifier free from silicone having an HLB value of 2 to 15 comprises an imidazoline.

18. The water-in-silicone emulsion according to claim 13, wherein the secondary emulsifier free from silicone is 0.01% to 1% by weight of the emulsion.

19. The water-in-silicone emulsion according to claim 13, wherein the primary non-ionic emulsifier free of silicone or blend of non-ionic emulsifiers free of silicone and the secondary emulsifier free from silicone have a combined average HLB of 2 to 8.

20. The water-in-silicone emulsion according to claim 1, wherein the cosolvent free of silicone has a vapor pressure less than 0.1 mmHg at 20° C. or a boiling point greater or equal to 216° C.

21. The water-in-silicone emulsion according to claim 1, wherein the co-solvent comprises an aliphatic, cycloaliphatic, or aromatic hydrocarbon or mixture thereof.

22. The water-in-silicone emulsion according to claim 1, wherein the co-solvent is saturated hydrocarbon co-solvent free of aromatic hydrocarbon.

23. The water-in-silicone emulsion according to claim 1, wherein the co-solvent is present from 2.5 percent to 15 percent by weight in the emulsion.

24. The water-in-silicone emulsion according to claim 1, wherein the emulsion is free of film-forming chemical components.

25. The water-in-silicone emulsion according to claim 1, wherein the emulsion is free of film-forming polymers.

26. The water-in-silicone emulsion according to claim 1, wherein the emulsion comprises a Volatile Organic Compound (VOC) content of 25 g/L or less according to SCAQMD Rule 1143.

27. The water-in-silicone emulsion according to claim 1, wherein the emulsion comprises a Volatile Organic Compound (VOC) content of 0.5 g/L or less according to CARB Consumer Product regulations.

28. The water-in-silicone emulsion according to claim 1, wherein the emulsion applied and spread in a thin layer evaporates completely in <5 minutes to leave a clean, film-free surface.

29. The water-in-silicone emulsion according to claim 1, wherein the emulsion has a flash point of >100° F.

30. The water-in-silicone emulsion according to claim 1, wherein the emulsion is applied in a thin layer.

31. A method of cleaning or preparing a surface, the method comprising:
    applying the water-in-silicone emulsion according to claim 1 to a surface as a thin film.

32. The method according to claim 31, further comprising wiping the water-in-silicone emulsion from the surface.

33. The method according to claim 31, wherein the surface is an automotive surface.

34. A method of cleaning or preparing a surface, the method comprising:
    applying the water-in-silicone emulsion according to claim 1 to a surface,
    wiping the emulsion from the surface, and
    applying paint to the wiped surface.

* * * * *